United States Patent
Huang et al.

(10) Patent No.: US 12,524,448 B2
(45) Date of Patent: Jan. 13, 2026

(54) DYNAMIC ROUTING OF REQUESTS TO CONTEXTUALLY-APPROPRIATE HANDLING TOOLS IN COMPUTING APPLICATIONS

(71) Applicant: INTUIT INC., Mountain View, CA (US)

(72) Inventors: Jianzhao Huang, Ontario (CA); Pratik Lala, San Jose, CA (US); John Patrick Symborski, Alberta (CA)

(73) Assignee: INTUIT INC., Mountain View, CA (US)

( * ) Notice: Subject to any disclaimer, the term of this patent is extended or adjusted under 35 U.S.C. 154(b) by 155 days.

(21) Appl. No.: 18/643,110

(22) Filed: Apr. 23, 2024

(65) Prior Publication Data

US 2025/0328557 A1    Oct. 23, 2025

(51) Int. Cl.
G06F 16/3329    (2025.01)
G06F 16/334    (2025.01)

(52) U.S. Cl.
CPC ...... *G06F 16/3329* (2019.01); *G06F 16/3344* (2019.01)

(58) Field of Classification Search
None
See application file for complete search history.

(56) References Cited

U.S. PATENT DOCUMENTS

2020/0285737 A1*    9/2020    Kraus ............... G06F 21/552
2022/0253725 A1*    8/2022    Feng ................ G06N 20/00

* cited by examiner

Primary Examiner — Quynh H Nguyen
(74) Attorney, Agent, or Firm — Patterson + Sheridan, LLP

(57) ABSTRACT

Aspects of the present disclosure provide techniques for dynamic request routing in a computing application. Embodiments include receiving a request via a user interface and determining, based on the request and associated contextual information, not to override use of a routing machine learning model for routing the request. Embodiments include providing the request to the routing machine learning model along with a prompt instructing the routing machine learning model to output an identifier of a software tool for handling the request and an input for the software tool. Embodiments include executing the software tool based on the identifier of the software tool and the input for the software tool. Embodiments include determining a response to the request based on the executing of the software tool and providing the response via the user interface.

20 Claims, 5 Drawing Sheets

DYNAMIC ROUTING OF REQUESTS TO CONTEXTUALLY-APPROPRIATE HANDLING TOOLS IN COMPUTING APPLICATIONS

INTRODUCTION

Aspects of the present disclosure relate to techniques for dynamically routing requests, such as user queries, in computing applications to appropriate tools for handling such requests based on contextual information.

BACKGROUND

Every year millions of people, businesses, and organizations around the world utilize software applications to assist with countless aspects of life. Software applications typically perform actions and/or generate automated responses based on requests submitted by users, such as natural language queries and/or other forms of user input.

Routing a user request to an appropriate software tool for handling can be challenging in many cases. For example, software applications increasingly allow users to submit requests via natural language input, and the open-ended nature of such input may make it difficult to determine which software tool is best suited for handling a given request. Furthermore, it is often challenging to determine what inputs should be provided to a particular software tool in connection with handling a request, such as determining which types of context information to include and/or determining a prompt to provide to the particular software tool (e.g., in the event that the software tool is a language processing machine learning model). In many cases, selecting the wrong software tool for handling a given request and/or the wrong inputs for such a software tool can result in an incorrect response, inefficient processing, failure, and/or other suboptimal results.

As such, there is a need in the art for improved techniques of routing requests to software tools for handling in computing applications.

BRIEF SUMMARY

Certain embodiments provide a method for dynamic request routing in a computing application. The method generally includes: receiving a request via a user interface; determining, based on the request and associated contextual information, not to override use of a routing machine learning model for routing the request; providing the request to the routing machine learning model along with a prompt instructing the routing machine learning model to output an identifier of a software tool for handling the request and an input for the software tool; receiving the identifier of the software tool and the input for the software tool from the routing machine learning model; executing the software tool based on the identifier of the software tool and the input for the software tool; determining a response to the request based on the executing of the software tool; and providing the response via the user interface.

Other embodiments comprise systems configured to perform the method set forth above as well as non-transitory computer-readable storage mediums comprising instructions for performing the method set forth above.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 6 depicts an example processing system for dynamic request routing in a computing application, according to certain embodiments.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
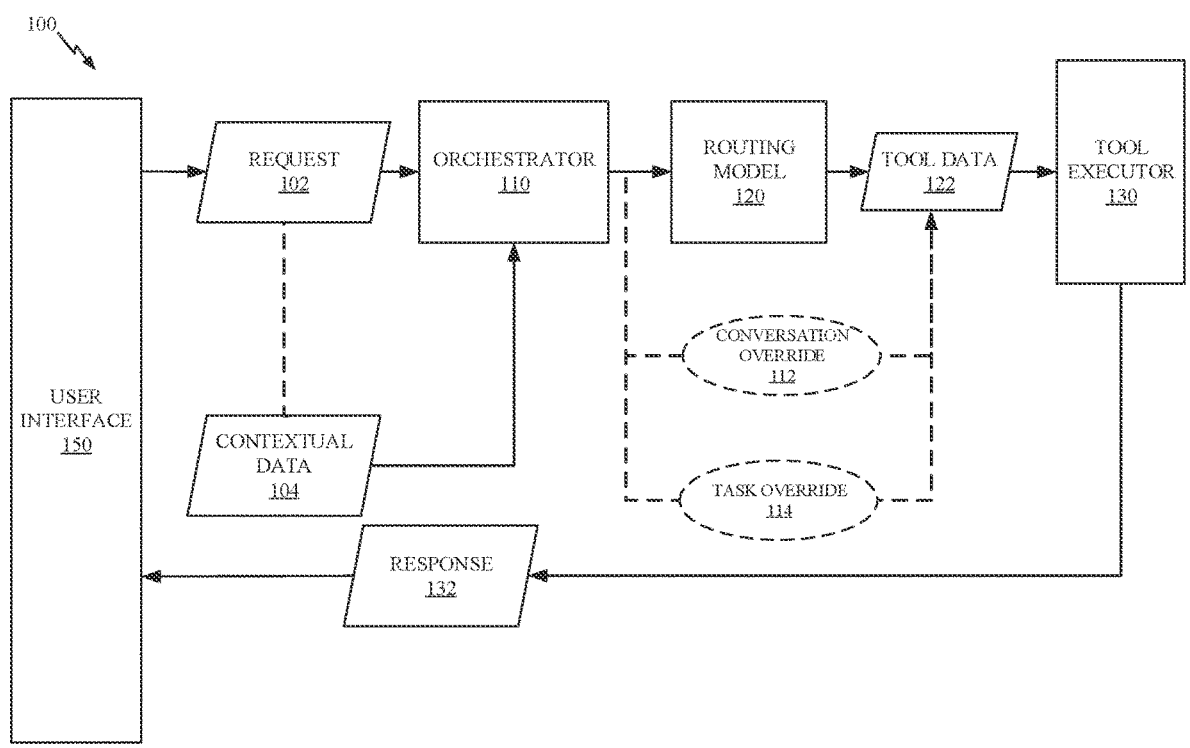
FIG. 1 is a diagram illustrating example computing components related to dynamic request routing in a computing application, according to certain embodiments.

Aspects of the present disclosure provide apparatuses, methods, processing systems, and computer-readable mediums for dynamic request routing in a computing application.

Computing applications may utilize a variety of different software tools for handling requests from users, such as to perform actions and/or generate responses to such requests. For example, software tools may include machine learning models, algorithms, and/or other functional nodes that may be part of the computing application and/or external to the computing application. A user may request functionality via various types of input, such as interacting with user interface elements and/or providing natural language input specifying the functionality that is requested. Techniques described herein involve routing a request received from a user to an applicable software tool through a process that involves dynamically selecting a routing technique based on contextual information, using the selected routing technique to determine an applicable software tool and an input to that software tool, and then executing determined software tool with the determined input to handle the request.

As described in more detail below with respect to FIG. 1, different routing techniques may be best suited to different situations. For example, a language processing machine learning model such as a large language model (LLM) may be used to route a request to a software tool in many cases, such as by providing the request (and, in some embodiments, certain contextual information determined to be useful) to such a model along with a prompt instructing the model to determine a software tool and an input to that software tool for handling the request. However, in some cases it may be inefficient and/or otherwise suboptimal to use such a model for request routing. Thus, aspects of the present disclosure involve overriding a model-based routing technique under certain circumstances, such as when a particular software tool is directly identified in connection with a request and/or when a request relates to an ongoing task that is associated with a particular software tool. Particular techniques for dynamic request routing are described in more detail below with respect to FIG. 2.

Once a software tool and an input for that software tool are dynamically determined for handling a request according to techniques described herein, the software tool may be executed using the determined input. For example, executing the software tool may involve providing input to a machine learning model, calling an application programming interface (API) function, running a software module, and/or the like. As described in more detail below with respect to FIG. 3, an output from such a software tool may be evaluated to determine whether the request was successfully handled by the software tool, and/or whether an alternative software tool (e.g., a fallback tool) should be used for handling the request.

A response to the request may be determined based on executing the software tool (and/or, in some embodiments, a fallback tool), and the response may then be provided to the user. For example, the response may include a confirmation that a requested action was performed, an indication of information requested by the user, a natural language response to a natural language query, an error notification, a request for additional information, and/or the like.

Techniques described herein improve the technical field request routing in computing applications in a number of ways. For instance, by dynamically determining a routing technique for routing a particular request based on contextual information related to the particular request, embodiments of the present disclosure avoid inaccurate results and/or inefficient use of computing resources that would otherwise occur as a result of using a routing technique that is not dynamically selected for the request. For example, overriding a machine learning model based routing technique when contextual information indicates that a particular software tool is directly identified in connection with a request and/or based on one or more software tools associated with an ongoing operation avoids the computing resources that would otherwise be unnecessarily used in connection with a machine learning model based approach and/or the incorrect results that could potentially be produced by a machine learning model based approach when such an approach is not needed or useful.

Furthermore, using a language processing machine learning model to dynamically determine a software tool and to generate an input to the software tool (in cases where such an approach is not dynamically overridden based on context) allows a request to be automatically matched with an optimal software tool for handling and allows the selected software tool to be effectively used to handle the request even in cases where a particular software tool is not directly specified in the request. Utilizing a database of software tool configuration information to dynamically provide information about available software tools to such a language processing machine learning model along with a request allows available software tools to be added, removed, and/or otherwise changed or reconfigured independently of the request routing logic, thereby allowing for more fine-grained and efficient control of software tool configuration. Additionally, dynamically determining whether to provide contextual information along with a request to a language processing machine learning model used for routing the request, such as based on one or more conditions related to the request, allows for more resource-efficient and/or accurate routing based on whether such contextual information is likely to be useful. Certain embodiments further involve prompting the language processing machine learning model to output explainability information related to a routing determination, such as a reason why a certain software tool or software tool input was selected by the model, thereby improving the auditability, explainability, and/or transparency of techniques described herein.

Evaluating results of a software tool to determine whether the software tool produced a successful output further improves the functioning of a computing application by avoiding incorrect or erroneous results and/or by dynamically determining whether a fallback software tool should be used to provide an alternative result in cases where the software tool produced a problematic result. Thus, techniques described herein provide a robust, fault-tolerant approach to request handling in computing applications.

Techniques described herein avoid erroneous results and/or model hallucinations in a variety of ways, such as by dynamically overriding use of a language processing machine learning model for request routing in cases where such a model is not needed or useful, by dynamically determining whether to provide certain contextual information along with a request to such a language processing machine learning model for request routing, and/or by utilizing such a language processing machine learning model to generate an input for a software tool (e.g., which may itself be a machine learning model) that is tailored for that tool and for a particular request in order to produce an accurate result.

Example Computing Components Related to Dynamic Request Routing

FIG. 1 is a diagram 100 illustrating example computing components related to dynamic request routing in a computing application, according to certain embodiments.

In diagram 100, a request 102 is received via a user interface 150. User interface 150 generally represents an interface through which one or more users interact with a computing application, such as displaying and/or otherwise outputting content and/or receiving input via one or more user interface elements and/or input devices. In one example, user interface 150 allows a user to provide natural language input, such as via text and/or audio, in order to request certain types of functionality provided by one or more computing applications. User interface 150 may also enable other types of input, such as selecting particular elements displayed in one or more screens.

Request 102 generally represents a request for one or more types of functionality. For example, request 102 may include natural language input and/or one or more other types of input requesting that one or more operations be performed, requesting certain information, providing certain information, and/or the like. Request 102 is associated with contextual data 104, which generally represents data related to request 102 such as user attributes, device attributes, application attributes, application history data, and/or the like. In one particular example, request 102 includes natural language input provided via an artificial intelligence (AI) assistant interface, and includes a request for certain information (from one or more data sources), and contextual data 104 includes information such as how long the user has been using the computing application, the user's occupation and/or experience level, known interests of the user, the application version being used, the type and/or version of the device from which the user is accessing user interface 150, the operating system (OS) running on the device, the user's clickstream data indicating prior actions with the application, data related to past requests of the user and/or results of handling those requests, state machine(s) related to ongoing processing with the application, and/or the like.

Request 102 and contextual data 104 are provided to an orchestrator 110 for dynamically determining a routing technique for routing request 102 to an applicable software tool for handling. Orchestrator 110 generally performs operations related to determining which routing technique to use for a given request, such as selecting between use of routing model 120, conversation override 112, or task override 114. In some embodiments, orchestrator 110 determines whether either conversation override 112 or task override 114 is applicable to request 102 based on contextual data 104 and, if neither is applicable, proceeds with use of routing model 120.

In one example, orchestrator 110 determines that conversation override 112 is applicable if contextual data 104 indicates that the user specified a particular software tool, such as by selecting a particular user interface element (e.g., clicking a button associated with the particular software tool), indicating the particular software tool in configuration information, choosing an application flow or input method associated with the particular software tool, and/or the like. For example, conversation override 112 may be applicable if the user provided request 102 in connection with a user interface element associated with performing a certain type of operation (e.g., performing a particular type of search, generating a particular type of content, and/or the like). In a particular example, request 102 may include text that was submitted via a text box associated with a button or application flow for converting input text to a particular type of database query. In such cases, use of routing model 120 may produce inaccurate and/or inefficient results, and is not needed or useful because the applicable software tool is already evident from contextual data 104. Thus, conversation override 112 allows the use of routing model 120 to be dynamically overridden in such cases.

In another example, orchestrator 110 determines that task override 114 is applicable if contextual data 104 indicates that a particular software tool is applicable to request 102 as a result of request 102 being related to an ongoing task (e.g., indicated in application history data and/or by a state machine associated with ongoing execution of the task). For example, if a previous request from the user was handled by a particular software tool, and orchestrator 110 determines that request 102 is related to ongoing processing associated with the previous request (e.g., a multi-turn task for which additional information was needed), then task override 114 may be used to route request 102 to that particular software tool (or another particular software tool connected with ongoing task execution) for handling. In such cases, use of routing model 120 may produce inaccurate and/or inefficient results, and is not needed or useful because the applicable software tool is already evident from contextual data 104. Thus, task override 114 allows the use of routing model 120 to be dynamically overridden in such cases.

If neither conversation override 112 or task override 114 is applicable, then orchestrator 110 may proceed with use of routing model 120 for routing request 102 to an applicable software tool. Routing model 120 generally represents a machine learning model that has been trained through supervised, unsupervised, and/or semi-supervised machine learning techniques. In a particular example, routing model 120 is a language processing machine learning model such as a large language model (LLM). For example, routing model 120 may have been trained on a large training data set in order to process natural language inputs and generate natural language content in response. In some embodiments, routing model 120 is a generative pre-trained (GPT) model that has been trained on a large set of training data (e.g., across a plurality of domains), and is capable as a result of such training to perform a wide variety of language-related tasks in response to natural language prompts. In some embodiments routing model 120 has been fine-tuned for one or more particular domains, such as for use with a particular software application or for a specific purpose, while in other embodiments routing model 120 has been trained in a more general fashion and has not been fine-tuned in such a manner. Routing model 120 may have a large number of tunable parameters, which are iteratively adjusted during a model training process based on training data.

Request 102 may be provided to routing model 120 along with a prompt instructing routing model 120 to identify a software tool for handling request 102 and, in some embodiments, to generate an input for that software tool. The prompt may include information about available software tools from which routing model 120 may select an applicable tool, such as based on a software tool configuration information database. In some cases, the prompt may further instruct routing model 120 to output an explanation of its tool and/or input selection/generation, such as identifying one or more reasons why that tool and/or tool input was selected/generated. In some embodiments, some or all of contextual data 104 may be provided to routing model 120 along with request 102 and the prompt, such as based on a determination of whether such contextual data is likely to be useful (e.g., which may be based on whether one or more particular words or strings are present in request 102 and/or whether one or more other conditions are met).

Tool data 122 is determined based on request 102, either using routing model 120, conversation override 112, or task override 113. Tool data 122 may include an identifier of a software tool, an input for the software tool, and, in some embodiments, an explanation of why the software tool and/or tool input was selected/generated (e.g., if routing model 120 is used and if the prompt includes a request for such explanatory information). If an explanation is included in tool data 122, the explanation may be logged, stored, and/or otherwise output for auditing, analysis, and/or explainability purposes.

Utilization of routing model 120, conversation override 112, and task override 114 are described in more detail below with respect to FIG. 2.

Tool data 122 is provided to tool executor 130 in order to execute the determined software tool for handling request 102. For example, tool executor may run, invoke, or otherwise execute the software tool identified in tool data 122, such as using a tool input included in tool data 122. If the software tool is a machine learning model, tool executor may provide input to the machine learning model based on the tool input included in tool data 122, which may include a prompt and/or other input data (e.g., including some or all of request 102 and/or contextual data 104). For example, the software tool may be a language processing machine learning model such as an LLM, and the tool input may include a natural language prompt that is based on request 102 and/or contextual data 103, and/or may include request 102 and/or aspects of contextual data 103. In another example, the software tool is a software component internal to or separate from the computing application associated with user interface 150, and is invoked by calling an API function, such as providing input parameters to the API function based on the tool input indicated in tool data 122. It is noted that API functions are included as an example, and other means of invoking and/or otherwise executing software tools are possible with techniques described herein. More generally, tool executor 130 causes the software tool identified in tool data 122 to be executed in order to handle request 102, such as based on a tool input included in tool data 122. Executing the software tool to handle the request may involve performing one or more operations, retrieving data from one or more sources, writing data to one or more sources, determining a response to the request (e.g., a natural language response), and/or the like. In some cases, tool executor utilizes a state machine for executing the software tool. For example, the software tool may be associated with a state machine that includes the different states through which execution of the tool may transition (e.g., based on results of each subsequent operation performed by the software tool), and the state machine may be executed in order to execute the software tool and track the state of execution. In some embodiments, a state machine may be executed across handling of multiple requests, and may be used to determine that task override 114 is applicable in certain cases, such as if a state machine associated with handling a prior request is still in progress and indicates a particular software tool that may be applicable to handling a current or subsequent request.

In some embodiments, tool executor 130 evaluates a result of executing the software tool to determine whether the response was successfully handled. If tool executor 130 determines that the response was not successfully handled (e.g. which may be determined based on an error message, failure, and/or other condition such as an output from the software tool that does not meet one or more conditions), tool executor 130 may use a fallback software tool (e.g., that is associated with the software tool) to handle request 102. The fallback software tool may, for example, be a related tool or a more generic tool. Operation of tool executor 130 is described in more detail below with respect to FIG. 3.

A response 132 may be provided from tool executor 130 back to user interface 150. For example, response 132 may generally represent a response to request 102 and/or otherwise may indicate results of handling request 102. In one example, response 132 is a natural language response generated by operation of a language processing machine learning model. In another example, response 132 includes a confirmation that one or more operations requested to be performed in request 102 were performed. In yet another example, response 132 includes a request for additional information, such as information needed or useful to execution of one or more software tools and/or state machines in connection with handling request 102. In still another example, response 132 indicates that an error occurred or that request 102 was otherwise not successfully handled.

Response 132 may be displayed via user interface 150. A user may perform one or more actions based on response 132, such as submitting a subsequent request, which may be routed and/or handled in a similar manner to that described with respect to FIG. 1.

In one particular example, a use encountered a bug and wants to open a support ticket with the right support professional or team to expedite resolution of the bug. In this example, request 102 may include a natural language query (e.g., "something is wrong with the application and I could not edit my personal info"). Orchestrator 110 may determine that conversation override 112 and task override 114 are not applicable, and routing model 120 may be used for routing. Certain contextual data 104 related to request 102 may be collected and, optionally, may be provided to routing model 120 along with request 102 (e.g., if it is determined that such contextual data is useful for routing the request, such as based on whether the request includes one or more particular words or phrases). Routing model 120 may output tool data 122 indicating a selection of a software tool for support case creation, such as because the request matches the description of that software tool. Tool data 122 may further include an input to be provided to that software tool.

Tool executor 130 may execute the support case creation software tool based on tool data 122, and the support case creation software tool may determine the product identifier of the application and the user impact based on the request and/or contextual data. However, the support case creation software tool may determine that additional information is missing in order to complete steps related to executing a state machine related to tool execution. Thus, a multi-turn task may be needed. Thus, request 102 and contextual data 104 may be stored, and the user may be prompted for additional information, such as via a natural language response via user interface 150 (e.g., "I am sorry to hear that. Could you provide more details on what you mean by 'I could not edit my personal info' such as where you encounter the issue and the user experience?"). The user may then submit s subsequent request via user interface 150, such as including a natural language query ("I was working on my W2 form and remembered I moved to a different country this year, so I tried clicking on the user profile button to edit my address, but it did not respond at all so I'm blocked. I also tried navigating to other placed but that did not get around the issue"). This subsequent request may trigger task override 114, as it is associated with an ongoing task (e.g., execution of a state machine involving a multi-turn conversation associated with one or more particular software tools, such as, in this case, the support case creation software tool). Thus, the support case creation software tool may be selected again without using routing model 120. The support case creation software tool may then be executed based on the previously stored information and the newly received information in the subsequent request in order to complete the task, such as generating a response "Got it. I think our user interface infrastructure team could help you resolve the issue. Do you want me to create a support case based on the information you provided?" The user may be provided with the response, and the user may submit a subsequent request (e.g., "Yes, please"), after which the support case creation software tool may again be executed (e.g., based on task override 114) and may create the support case and generate an additional response (e.g., "Done. Your case number is 12345. Please expect a message or call within two business days").

Dynamic Request Routing

Figure 2:
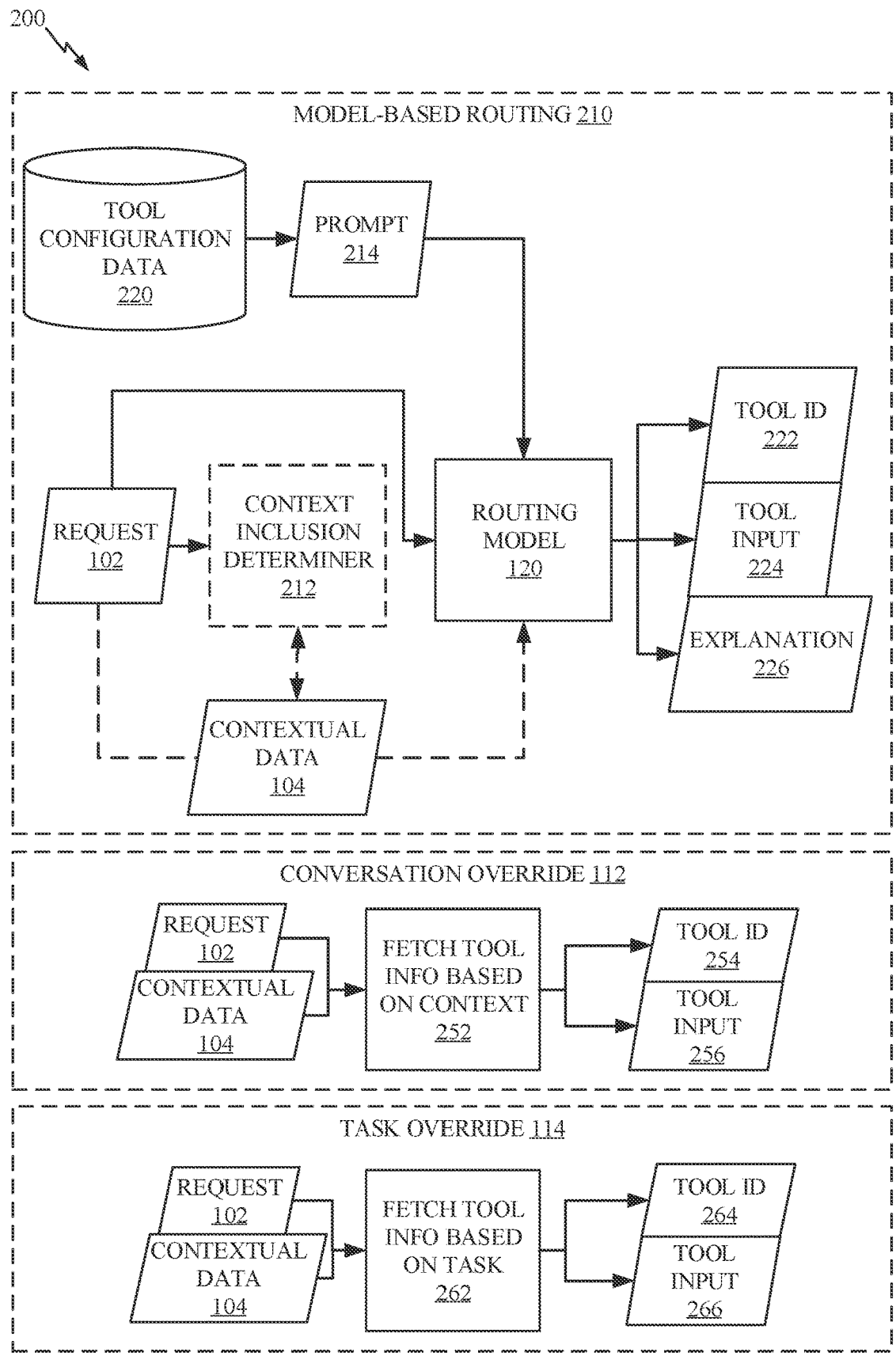
FIG. 2 is a diagram illustrating example processes for dynamic request routing in a computing application, according to certain embodiments.

FIG. 2 is a diagram 200 illustrating example processes for dynamic request routing in a computing application, according to certain embodiments. Diagram 200 includes request 102, contextual data 104, routing model 120, conversation override 112, and task override 114 of FIG. 1.

Model-based routing 210 represents a routing technique in which routing model 120 is used to route request 102. For example, as described above with respect to FIG. 1, model-based routing 210 may be used when neither conversation override 112 nor and task override 114 applies.

In model-based routing 210, a context inclusion determiner 212 may be used to determine whether one or more aspects of contextual data 104 are to be provided to routing model 120. For example, context inclusion determiner 212 may analyze request 102 to determine whether one or more conditions are present in order to determine whether contextual data is appropriate as an input to routing model 120 for handling request 102. The one or more conditions may relate to words and/or strings in request 102, a length of request 102, a type of request 102, and/or one or more other attributes of request 102. For example, if request 102 comprises a natural language query that includes a word or phrase indicating a temporal aspect to the request, such as "this" or "current" then context inclusion determiner 212 may determine to include contextual data 104 as an input to routing model 120, as request 102 may be referring to an entity relating to a particular day or time, which may be more clearly understood based on contextual data 104. In another example, if request 102 comprises a natural language query having a length that exceeds a threshold, then context inclusion determiner 212 may determine not to include contextual data 104 as an input to routing model 120, as the long natural language query may be likely to be sufficiently detailed such that contextual data 104 is not needed for understanding. These are included as examples of conditions evaluated by context inclusion determiner 212, and other conditions are possible.

A prompt 214 may also be provided to routing model 120, such as including natural language instructions to select a software tool for handling request 102 and/or to generate an input to provide to the selected software tool. Prompt 214 may also instruct routing model 120 to output an explanation of its selection/generation of a software tool and/or tool input. In some embodiments, prompt 214 is generated in part based on tool configuration data 220. For example, tool configuration data 220 may represent data, such as stored in a database or other data storage entity, about a plurality of available software tools that can be used for handling requests. Tool configuration data 220 may include information about each of a plurality of software tools, such as a tool identifier, a tool description, tool input parameters, one or more examples of requests or phrases that would be handled by the tool or otherwise are associated with the tool, and/or the like. Tool configuration data 220 may be updated over time, such as to add, remove, and/or modify information about individual software tools. Prompt 214 may be dynamically populated based on tool configuration data 220, such as including the latest software tool configuration information, thereby allowing tools to be conveniently and centrally configured without the need to change routing logic.

Routing model 120 may output a tool identifier 222, a tool input 224, and, in some embodiments, an explanation 226 based on request 102, prompt 214, and, if provided, contextual data 104. Tool identifier 222 may comprise a unique identifier of a particular software tool (e.g., selected from a list of software tools included in prompt 214, such as based on tool configuration data 220) that is selected by routing model 120 for handling request 102. Tool input 224 may comprise an input to be provided to the software tool, and may have been generated by routing model 120, such as based on instructions in prompt 214. For example, if the software tool is a language processing machine learning model, tool input 224 may include a prompt and/or one or more other inputs (e.g., including some or all of request 102 and/or contextual data 104). If the software tool may be invoked via an API call, then tool input 224 may include the API call with input parameters populated as appropriate, such as based on request 102 and/or contextual data 104. Explanation 226 may indicate a reason why the software tool identified by tool identifier 222 was selected by routing model 120 (e.g., because request 102 included particular language and/or because contextual data 104 includes one or more particular data items, and/or the like) and/or why tool input 224 was generated (e.g., because particular types of inputs are generally useful for handling a particular type of request, and/or the like). Tool identifier 222, tool input 224, and/or explanation 226 may be an example of tool data 122 of FIG. 1.

Conversation override 112 involves bypassing use of routing model 120, and instead fetching, at block 252, tool information based on contextual data 104 related to request 102. For example, if contextual data 104 indicates a particular software tool, such as based on a user interface element selected by the user and/or configuration information or other aspect(s) related to request 102 by which a particular software tool may be specified, then that particular software tool may be selected. For example, the tool identifier 254 of the software tool indicated in contextual data 104 may be determined. Furthermore, a tool input 256 may be determined based on the selected software tool and request 102 (and, in some embodiments, based on contextual data 104). For example, if contextual data 104 indicates that the user selected a user interface element associated with generating a graph query language (graphQL) query and provided a natural language query in association with selecting the user interface element, then tool identifier 264 may be the identifier of a software tool that converts natural language queries to graphQL queries, and tool input 266 may include the natural language query provided by the user, which is to be processed by the software tool. Tool identifier 254 and tool input 256 may be an example of tool data 122 of FIG. 1.

Task override 114 involves bypassing use of routing model 120, and instead fetching, at block 262, tool information based on an ongoing task related to request 102. For example, the ongoing task may relate to one or more previously-handled requests, and may be associated with one or more particular software tools. In one example, a state machine associated with running one or more software tools for handling one or more previous requests is ongoing, and the state machine is used to determine that a particular software tool is applicable to request 102. For example, request 102 may include additional information relevant to ongoing operations by a software tool, and operations of the software tool may resume based on request 102, such as providing request 102 as a tool input 266 to the software tool (e.g., identified by tool identifier 264). In another example, a state machine may involve a handoff from a first software tool (e.g., used to handle a previous request) to a second software tool, and request 102 may relate to the second software tool, and the second software tool may be identified based on the state machine and a determination that request 102 relates to the ongoing operations of the state machine. Generally, tool identifier 164 comprises the identifier of a software tool that relates to one or more ongoing tasks (e.g., which may be determined based on contextual data 104), and tool input 266 comprises an input for that software tool, such as including some or all of request 102 and/or contextual data 104. Tool identifier 264 and tool input 266 may be an example of tool data 122 of FIG. 1.

Example Software Tool Execution for Dynamic Request Handling

Figure 3:
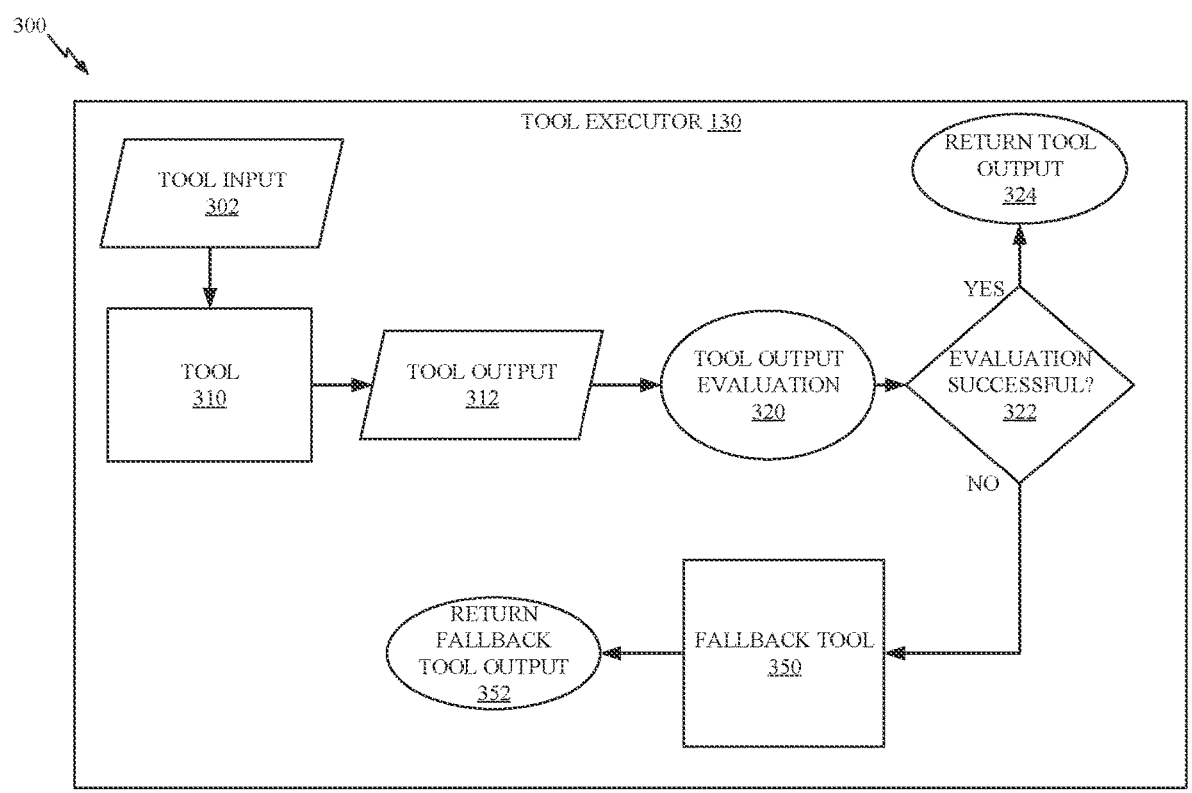
FIG. 3 is a diagram depicting an example of dynamic request handling in a computing application, according to certain embodiments.

FIG. 3 is a diagram 300 depicting an example of dynamic request handling in a computing application, according to certain embodiments. Diagram 300 includes tool executor 130 of FIG. 1, and generally represents operations that may be performed by such a tool executor.

Tool executor 130 provides tool input 302 to tool 310, which produces tool output 312. Tool input 302 may be representative of tool input 224, tool input 256, or tool input 266 of FIG. 2, and generally represents one or more inputs that are provided to tool 310 in connection with handling a request. Tool 310 represents a software tool that has been determined through a dynamic routing process described herein, such as based on model-based routing 210, conversation override 112, or task override 114 of FIG. 2. In one example, tool 310 comprises a machine learning model such as a language processing machine learning model, and tool input 302 comprises one or more inputs to the machine learning model, such as including a natural language prompt. In another example tool 310 is a software component that is invoked by calling an API function, and tool input 302 comprises an API function call including one or more input parameters.

Tool 310 is executed based on tool input 302 in order to generate tool output 312. Tool output 312 may include content generated, determined, and/or retrieved by tool 310, and/or may otherwise indicate results of executing tool 310 based on tool input 302 to handle a request.

Tool output evaluation 320 is performed in some embodiments, such as to determine whether tool 310 successfully handled the request. For example, tool output evaluation 320 may involve determining whether tool output 312 includes an error condition or otherwise indicates a problem or failure. In some cases, tool output evaluation 320 involves comparing tool output 312 to one or more expected ranges or to a list of possible successful outputs associated with tool 310, and/or otherwise determining whether tool output 312 satisfies one or more success criteria, which may be specifically defined for tool 310. For example tool output evaluation 320 may be based on configured tool output evaluation rules, which may be specific to particular tools and/or general to all tools. In one specific example, tool 310 is a graphQL query generation tool, and a tool output evaluation rule for tool 310 involves determining whether tool output 312 complies with expected syntax of a graphQL query and/or that tool output 312 can successfully be executed as a graphQL query.

At decision 322, tool executor 130 determines whether tool output evaluation 320 produced a successful result. If the evaluation was successful, then tool output 312 may be returned at step 324, such as using tool output 312 as a response to the request or using tool output 312 to determine a response to the request. If the evaluation was not successful, then tool executor 130 may use a fallback tool 350 to generate an alternative output. For example, fallback tool 350 may be a software tool that is related to tool 310 or that is more generic than tool 310, and tool executor 130 may have been configured to use fallback tool 350 as a fallback when tool 310 is unsuccessful. In some cases, each software tool is configured with a fallback tool that is to be used in the event that that software tool is unsuccessful. In one example, tool 310 is a software tool that searches for asset management information about particular assets in a system and fallback tool 350 is a general search tool that searches through a broader range of information related to the system. If tool output evaluation 320 results in a determination that tool output 312 indicates a failure to successfully handle the request (e.g., if the asset management search failed or was unable to locate a result) then fallback tool 350 may be used (e.g., to perform a more general search). The input to fallback tool 350 may be determined based on the request and/or contextual data. For example, the input to fallback tool 350 may be the same as or similar to tool input 302 and/or may otherwise be tailored to fallback tool 350. In some cases, routing model 120 of FIG. 1 may be used to generate an input for fallback tool 350 based on the request and/or associated context information.

In some embodiments (not shown), the output from fallback tool 350 is also evaluated in a similar manner to tool output evaluation 320 and, if fallback tool 350 was unsuccessful, then a different software tool may be used (e.g., a default fallback tool such as a general LLM) or an error notification (or a request for alternative or additional information) may be returned as the response to the request. Otherwise (e.g., if evaluation is successful, or if evaluation is not performed), the output from fallback tool 250 may be returned at step 352, such as being used as a response to the request or being used to determine a response to the request.

Thus, techniques described herein provide a dynamic, robust, and fault-tolerant approach to request handling in computing applications.

Example Operations for Dynamic Request Routing in a Computing Application

Figure 4:
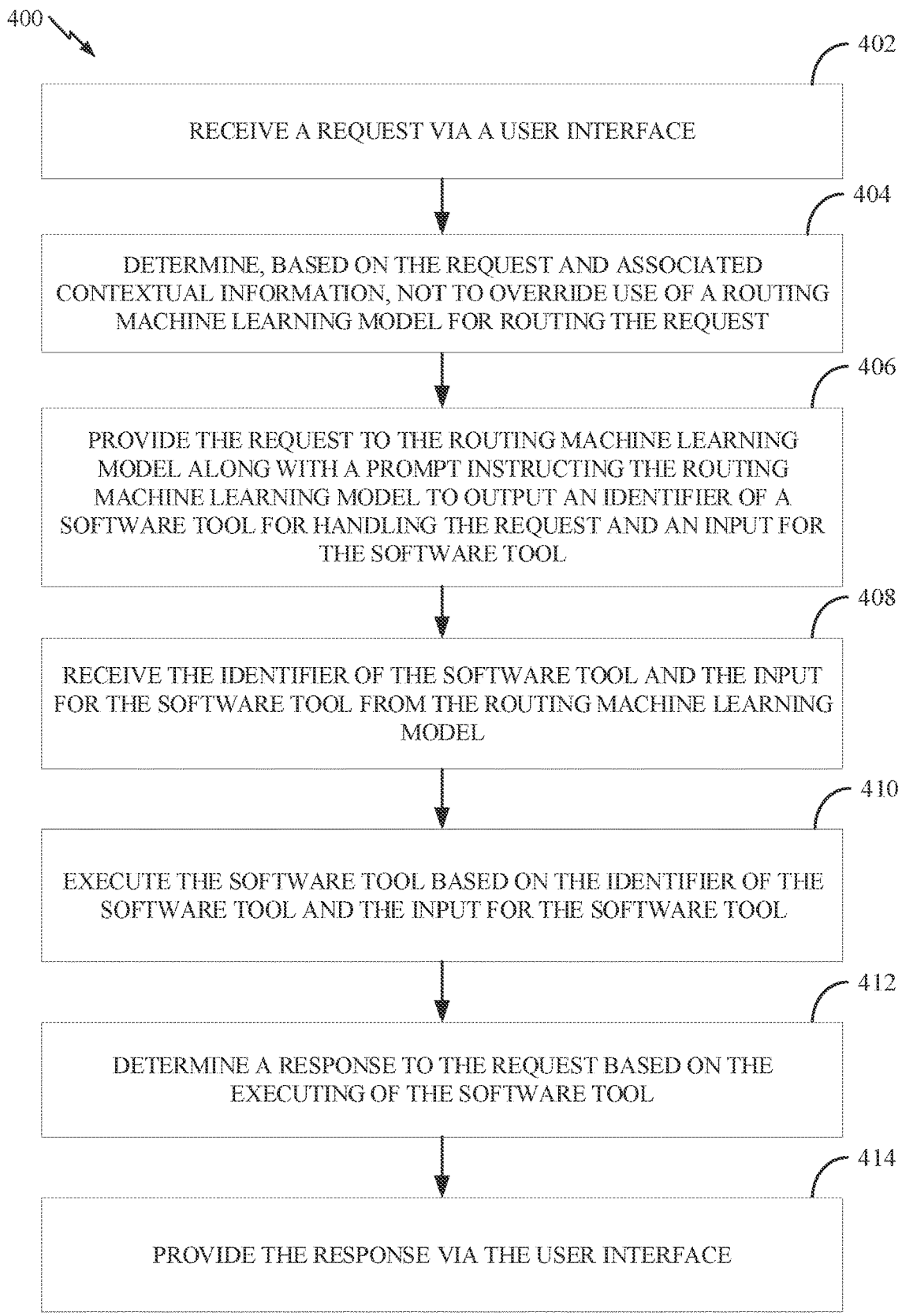
FIG. 4 depicts example operations related to dynamic request routing in a computing application, according to certain embodiments.

FIG. 4 depicts example operations 400 related to dynamic request routing in a computing application, according to certain embodiments. For example, operations 400 may be performed by one or more components described above with respect to FIGS. 1-3, system 500 of FIG. 5 (described below), and/or one or more other components and/or devices.

Operations 400 begin at step 402, with receiving a request via a user interface.

Operations 400 continue at step 404, with determining, based on the request and associated contextual information, not to override use of a routing machine learning model for routing the request.

Operations 400 continue at step 406, with providing the request to the routing machine learning model along with a prompt instructing the routing machine learning model to output an identifier of a software tool for handling the request and an input for the software tool.

Operations 400 continue at step 408, with receiving the identifier of the software tool and the input for the software tool from the routing machine learning model.

Operations 400 continue at step 410, with executing the software tool based on the identifier of the software tool and the input for the software tool.

Operations 400 continue at step 412, with determining a response to the request based on the executing of the software tool.

Operations 400 continue at step 414, with providing the response via the user interface.

In certain embodiments, the request comprises a natural language query, and the software tool comprises a language processing machine learning model trained to generate responses based on natural language queries.

In some embodiments, the input for the software tool that is output by the routing machine learning model comprises a natural language prompt to be provided to the language processing machine learning model. In certain embodiments, the routing machine learning model comprises a language processing machine learning model, and the prompt further includes information about a plurality of available software tools including the software tool.

In some embodiments, the information about the plurality of available software tools comprises software tool identifiers, software tool descriptions, and software tool inputs.

In certain embodiments, the determining, based on the request and the associated contextual information, not to bypass use of the routing machine learning model for routing the request comprises determining whether a specific software tool is directly identified in the associated contextual information.

In some embodiments, the associated contextual information comprises information related to handling of one or more other requests that were handled prior to the request.

Certain embodiments further comprise determining to override use of the routing machine learning model for routing a subsequent request based on context information associated with the subsequent request indicating that a specific software tool is to be used for handling the subsequent request.

In some embodiments, the prompt further instructs the routing machine learning model to output explainability information indicating why the software tool was selected, and wherein the method further comprises receiving the explainability information from the routing machine learning model.

Certain embodiments further comprise evaluating an output from the executing of the software tool and determining whether to use a fallback software tool associated with the software tool based on the evaluating.

Some embodiments further comprise determining, based on one or more text strings in the request, whether to provide certain contextual information along with the request and the prompt to the routing machine learning model.

In some embodiments, the executing of the software tool based on the identifier of the software tool and the input for the software tool comprises invoking an application programming interface (API) function indicated by the identifier of the software tool and providing the input for the software tool as an input to the API function.

Notably, method 400 is just one example with a selection of example steps, but additional methods with more, fewer, and/or different steps are possible based on the disclosure herein.

Example Computing System

Figure 5:
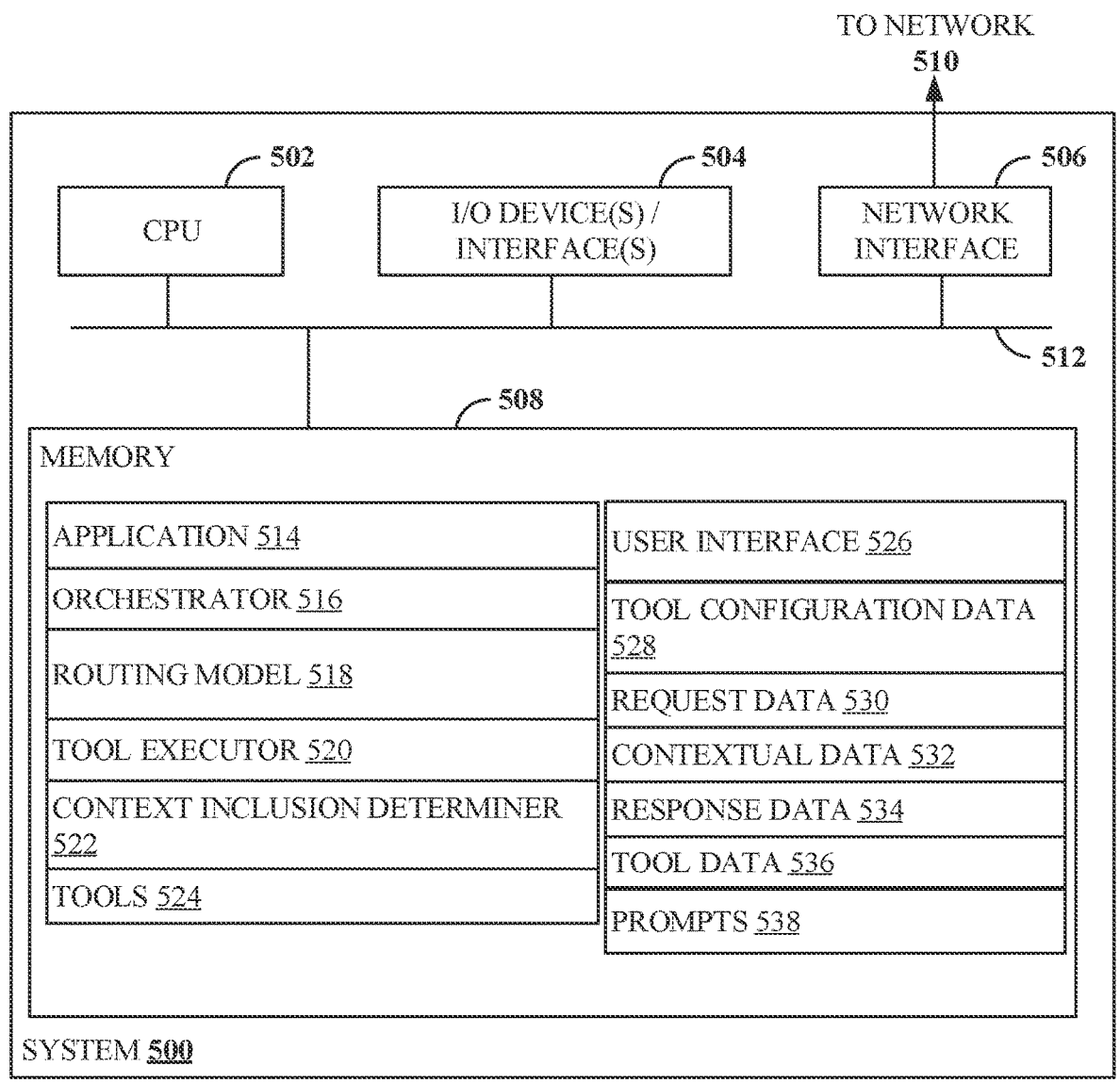

FIG. 5 illustrates an example computing system 500 with which embodiments of the disclosure related to dynamic request routing in a computing application may be implemented. For example, the computing system 500 may perform functionality described above with respect to FIGS. 1-3, and/or may perform operations 400 of FIG. 4.

The computing system 500 includes a central processing unit (CPU) 502, one or more I/O device interfaces 504 that may allow for the connection of various I/O devices 504 (e.g., keyboards, displays, mouse devices, pen input, etc.) to the computing system 500, a network interface 506, a memory 508, and an interconnect 512. It is contemplated that one or more components of the computing system 500 may be located remotely and accessed via a network 510. It is further contemplated that one or more components of the computing system 500 may include physical components or virtualized components.

The CPU 502 may retrieve and execute programming instructions stored in the memory 508. Similarly, the CPU 502 may retrieve and store application data residing in the memory 508. The interconnect 512 transmits programming instructions and application data, among the CPU 502, the I/O device interface 504, the network interface 506, the memory 508. The CPU 502 is included to be representative of a single CPU, multiple CPUs, a single CPU having multiple processing cores, and other arrangements.

Additionally, the memory 508 is included to be representative of a random access memory or the like. In some embodiments, the memory 508 may include a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, the memory 508 includes an application 514 which may be representative of a computing application that provides functionality described herein related to dynamic request routing, such as an application associated with user interface 526 by which users may submit requests and receive responses related to various types of application functionality. Memory 508 further includes orchestrator 516, routing model 518, and tool executor 520, which may be generally representative of orchestrator 110, routing model 120, and tool executor 130 of FIG. 1.

Memory 508 further includes context inclusion determiner 522, which may represent context inclusion determiner 212 of FIG. 2. Memory 508 further includes tools 524, which may include tool 310 and fallback tool 350 of FIG. 3. Memory 508 further includes user interface 526, which may be representative of user interface 150 of FIG. 1. Memory 508 further includes tool configuration data 528, which may be representative of tool configuration data 220 of FIG. 2.

Memory 508 further includes request data 530 and contextual data 532, which may generally include request 102 and contextual data 104 of FIG. 1. Memory 508 further includes response data 534, which may include response 132 of FIG. 1. Memory 508 further includes tool data 536, which may include tool data 122 of FIG. 1 and/or tool identifier 222, tool input 224, explanation 226, tool identifier 254, tool input 256, tool identifier 264, and/or tool input 266 of FIG. 2. Memory 508 further includes prompts 538, which may include prompt 214 of FIG. 2 and/or one or more of tool inputs 224, 256, and/or 266 (e.g., when such tool inputs include a prompt).

It is noted that system 500 is included as an example, and certain functionality described with respect to system 500 and/or otherwise described herein may be implemented via more or fewer devices and/or components.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for dynamic request routing in a computing application, comprising:
   receiving a request via a user interface;
   determining, based on the request and associated contextual information, not to override use of a routing machine learning model for routing the request;
   providing the request to the routing machine learning model along with a prompt instructing the routing machine learning model to output an identifier of a software tool for handling the request and an input for the software tool;
   receiving the identifier of the software tool and the input for the software tool from the routing machine learning model;
   executing the software tool based on the identifier of the software tool and the input for the software tool;
   determining a response to the request based on the executing of the software tool; and
   providing the response via the user interface.

2. The method of claim 1, wherein the request comprises a natural language query, and wherein the software tool comprises a language processing machine learning model trained to generate responses based on natural language queries.

3. The method of claim 2, wherein the input for the software tool that is output by the routing machine learning model comprises a natural language prompt to be provided to the language processing machine learning model.

4. The method of claim 1, wherein the routing machine learning model comprises a language processing machine learning model, and wherein the prompt further includes information about a plurality of available software tools including the software tool.

5. The method of claim 4, wherein the information about the plurality of available software tools comprises software tool identifiers, software tool descriptions, and software tool inputs.

6. The method of claim 1, wherein the determining, based on the request and the associated contextual information, not to bypass use of the routing machine learning model for routing the request comprises determining whether a specific software tool is directly identified in the associated contextual information.

7. The method of claim 1, wherein the associated contextual information comprises information related to handling of one or more other requests that were handled prior to the request.

8. The method of claim 1, further comprising determining to override use of the routing machine learning model for routing a subsequent request based on context information associated with the subsequent request indicating that a specific software tool is to be used for handling the subsequent request.

9. The method of claim 1, wherein the prompt further instructs the routing machine learning model to output explainability information indicating why the software tool was selected, and wherein the method further comprises receiving the explainability information from the routing machine learning model.

10. The method of claim 1, further comprising evaluating an output from the executing of the software tool and determining whether to use a fallback software tool associated with the software tool based on the evaluating.

11. The method of claim 1, further comprising determining, based on one or more text strings in the request, whether to provide certain contextual information along with the request and the prompt to the routing machine learning model.

12. The method of claim 1, wherein the executing of the software tool based on the identifier of the software tool and the input for the software tool comprises invoking an application programming interface (API) function indicated by the identifier of the software tool and providing the input for the software tool as an input to the API function.

13. A system for dynamic request routing in a computing application, comprising:
   one or more processors; and
   a memory comprising instructions that, when executed by the one or more processors, cause the system to:
   receive a request via a user interface;
   determine, based on the request and associated contextual information, not to override use of a routing machine learning model for routing the request;
   provide the request to the routing machine learning model along with a prompt instructing the routing machine learning model to output an identifier of a software tool for handling the request and an input for the software tool;
   receive the identifier of the software tool and the input for the software tool from the routing machine learning model;
   execute the software tool based on the identifier of the software tool and the input for the software tool;
   determine a response to the request based on the executing of the software tool; and
   provide the response via the user interface.

14. The system of claim 13, wherein the request comprises a natural language query, and wherein the software tool comprises a language processing machine learning model trained to generate responses based on natural language queries.

15. The system of claim 14, wherein the input for the software tool that is output by the routing machine learning model comprises a natural language prompt to be provided to the language processing machine learning model.

16. The system of claim 13, wherein the routing machine learning model comprises a language processing machine learning model, and wherein the prompt further includes information about a plurality of available software tools including the software tool.

17. The system of claim 16, wherein the information about the plurality of available software tools comprises software tool identifiers, software tool descriptions, and software tool inputs.

18. The system of claim 13, wherein the determining, based on the request and the associated contextual information, not to bypass use of the routing machine learning model for routing the request comprises determining whether a specific software tool is directly identified in the associated contextual information.

19. The system of claim 18, wherein the associated contextual information comprises information related to handling of one or more other requests that were handled prior to the request.

20. A non-transitory computer readable medium comprising instructions that, when executed by one or more processors of a computing system, cause the computing system to:
- receive a request via a user interface;
- determine, based on the request and associated contextual information, not to override use of a routing machine learning model for routing the request;
- provide the request to the routing machine learning model along with a prompt instructing the routing machine learning model to output an identifier of a software tool for handling the request and an input for the software tool;
- receive the identifier of the software tool and the input for the software tool from the routing machine learning model;
- execute the software tool based on the identifier of the software tool and the input for the software tool;
- determine a response to the request based on the executing of the software tool; and
- provide the response via the user interface.

* * * * *